Patented Oct. 8, 1946

2,408,785

UNITED STATES PATENT OFFICE 2,408,785

METHOD OF PRODUCTION OF ANHYDROUS MONOFLUOROPHOSPHORIC ACID

Willy Lange, Cincinnati, Ohio, assignor, by direct and mesne assignments, to Ozark Chemical Company, Tulsa, Okla., a corporation of Delaware No Drawing. Application June 28, 1944, Serial No. 542,603

18 Claims. (Cl. 23—139)

In an application for United States Letters Patent, Serial No. 478,838, filed March 11, 1943 by Ralph Livingston and me, jointly, anhydrous monofluorophosphoric acid ($H_2PO_3F$) and a method of producing it from anhydrous hydrofluoric acid and water-free metaphosphoric acid are described and claimed, but the production of metaphosphoric acid exactly corresponding to the formula $HPO_3$ and free from its dehydration products for use in that method is accomplished only with a certain amount of difficulty. Thus a method for the production of monofluorophosphoric acid not requiring the use of the somewhat difficultly preparable metaphosphoric acid offers advantages over that disclosed in the said application.

Moreover anhydrous difluorophosphoric acid ($HPO_2F_2$) would be of distinct commercial value if available to industry, but while a dilute aqueous solution of this acid has been known for some time the solution cannot be concentrated without complete hydrolysis of the acid. The anhydrous form of this acid obtained as a by-product in the high temperature reaction between calcium fluoride and phosphorus pentoxide has also been described in literature in recent years but the quantities of the acid obtainable in this way are so small that the process is of no interest as a possible commercial source of anhydrous difluorophosphoric acid.

Earlier in the literature it has been pointed out that in reacting a 40% aqueous hydrofluoric acid solution and phosphorus pentoxide, the aqueous solution of a mixture of orthophosphoric acid and mono-, di- and hexafluorophosphoric ($HPF_6$) acids is obtained, the solution also containing unreacted hydrofluoric acid. But when an attempt is made to concentrate this solution the fluorophosphoric acids decompose with the result that it likewise is of no industrial value.

It is therefore a primary object of the present invention to provide a method adapted for use in a commercial way to produce anhydrous monofluorophosphoric acid ($H_2PO_3F$) through the use of phosphorus pentoxide ($P_2O_5$), a readily obtainable material, and hydrofluoric acid (HF) of suitable concentration.

A further object is to provide a method of producing the said acid either alone or in conjunction with anhydrous difluorophosphoric acid ($HPO_2F_2$) which, after separation from the monofluorophosphoric acid, forms a valuable by-product.

A still further object is the provision of a method of the character aforesaid which is capable of performance in such manner that none of the difluorophosphoric acid, substantially equal quantities of both acids or, between these two extremes, any desired percentage of difluorophosphoric acid with relation to the monofluorophosphoric acid may be produced.

Other objects, advantages and novel features, steps and operations comprehended by or incident to the invention are hereinafter more particularly pointed out or will be apparent from the following description.

This application is a continuation-in-part of my applications for United States Letters Patent, Serial Nos. 503,420 and 503,421, filed September 22, 1943, in which, respectively, I described and claimed a method of preparing substantially equal parts of monofluorophosphoric acid and difluorophosphoric acid through the reaction of phosphorus pentoxide with anhydrous hydrofluoric acid and subsequent distillation of the product resulting therefrom, and a method of preparing monofluorophosphoric acid by a generally corresponding reaction of phosphorus pentoxide and aqueous hydrofluoric acid of about 69% concentration without production of an appreciable amount of the difluorophosphoric acid.

The present invention therefore comprehends production either of monofluorophosphoric acid free or substantially free of difluorophosphoric acid or of monofluorophosphoric acid in conjunction with difluorophosphoric acid in any desired ratio up to substantially equal quantities of each by reaction of phosphorus pentoxide with hydrofluoric acid of from about 69%–100% HF concentration, so that by suitable selection of the degree of concentration and amount of the hydrofluoric acid, the method may be operated to supply either the monofluorophosphoric acid alone or the monofluorophosphoric and the difluorophosphoric acids in a predetermined ratio with consequent avoidance of production of an excess of difluorophosphoric acid in order to meet commercial demand for the monofluorophosphoric acid.

More specifically, I have discovered that the reaction product obtained at low temperatures in the violent reaction of phosphorus pentoxide with hydrofluoric acid of between about 69% and 100% inclusive HF concentration and in a predetermined ratio is a liquid in which all three fluorophosphoric acids (namely, mono-, di- and hexafluorophosphoric acids) and a fluorine-free phosphoric acid are present as can be shown by analytical methods described in the literature, but this liquid as such cannot be used for commercial purposes so far as I am aware. However, if it be subjected to heat under conditions such that none of the gaseous reaction products are allowed to escape, a succession of complicated intermediate reactions takes place, not presently known in detail, the end-product of which has a simple composition and is of definite commercial interest, said end-product being in accordance with the percentage concentration and relative quantity of the hydrofluoric acid employed either substantially pure monofluorophosphoric acid or a mixture of the monofluorophosphoric and difluorophosphoric acids which may be readily separated by distillation, preferably under vacuum, the difluorophosphoric acid passing off as the distillate and the monofluorophosphoric acid remaining as the distillation residue, the yield of crude difluorophosphoric acid approaching the theoretical value. Then if an analytically pure material is desired the crude difluorophosphoric acid may be re-distilled under vacuum; the residual monofluorophosphoric acid of the first distillation is of a technical grade and cannot be purified by further distillation.

The reaction between the phosphorus pentoxide and hydrofluoric acid of about 69% to 100% inclusive HF concentration to which reference has been made proceeds in accordance with the general equation $$P_2O_5 + (2+X) HF + (1-X) H_2O = X.HPO_2F_2 + (2-X) H_2PO_3F$$

in which X has any value in the range from 0 to 1 inclusive, and in the practice of the invention care should be taken that during the reaction the phosphorus pentoxide, hydrogen fluoride and water, if any, always meet in the ratio of 1 mole $P_2O_5 : (2+X)$ moles $HF : (1-X)$ mole $H_2O$ in which X has any value between 0 and 1 inclusive. By bearing this condition in mind one skilled in the art can readily calculate the quantity of hydrofluoric acid of a given HF concentration between about 69% and 100% inclusive which should be used with a certain quantity of phosphorus pentoxide in order to obtain the best results, as well as the necessary concentration and quantity of the hydrofluoric acid required if it be desired to produce both monofluorophosphoric and difluorophosphoric acids in a desired ratio.

However, to minimize the necessity for such calculations and to facilitate the practice of my invention, I have set out in the following table the parts by weight of hydrofluoric acid of various HF concentrations between about 69% and 100% inclusive which should be used with 100 parts by weight of phosphorus pentoxide, the value of X in the said equation in terms of moles and the resulting parts by weight of acid or acids which in accordance with the invention are obtained:

| Concentration of hydrofluoric acid in per cent HF | Value of X in terms of moles | Parts by weight of hydrofluoric acid to be used with 100 parts by weight of phosphorus pentoxide | Theoretical yields in parts by weight | |
|---|---|---|---|---|
| | | | Monofluorophosphoric acid | Difluorophosphoric acid |
| 68.97 | 0.00 | 40.84 | 140.84 | 0.00 |
| 69.00 | 0.001074 | 40.85 | 140.77 | 0.08 |
| 70.00 | 0.03226 | 40.89 | 138.57 | 2.32 |
| 71.00 | 0.06350 | 40.93 | 136.37 | 4.56 |
| 72.00 | 0.09483 | 40.98 | 134.17 | 6.81 |
| 73.00 | 0.1262 | 41.02 | 131.96 | 9.06 |
| 74.00 | 0.1577 | 41.07 | 129.74 | 11.33 |
| 75.00 | 0.1892 | 41.11 | 127.52 | 13.59 |
| 76.00 | 0.2208 | 41.16 | 125.29 | 15.87 |
| 77.00 | 0.2524 | 41.20 | 123.07 | 18.13 |
| 78.00 | 0.2852 | 41.25 | 120.76 | 20.49 |
| 79.00 | 0.3159 | 41.29 | 118.60 | 22.69 |
| 80.00 | 0.3478 | 41.34 | 116.35 | 24.99 |
| 81.00 | 0.3797 | 41.38 | 114.11 | 27.27 |
| 82.00 | 0.4118 | 41.43 | 111.85 | 29.58 |
| 83.00 | 0.4438 | 41.47 | 109.59 | 31.88 |
| 84.00 | 0.4760 | 41.52 | 107.32 | 34.20 |
| 85.00 | 0.5082 | 41.56 | 105.06 | 36.50 |
| 86.00 | 0.5405 | 41.61 | 102.78 | 38.83 |
| 87.00 | 0.5728 | 41.65 | 100.50 | 41.15 |
| 88.00 | 0.6053 | 41.70 | 98.22 | 43.48 |
| 89.00 | 0.6378 | 41.74 | 95.93 | 45.81 |
| 90.00 | 0.6703 | 41.79 | 93.64 | 48.15 |
| 91.00 | 0.7030 | 41.84 | 91.34 | 50.50 |
| 92.00 | 0.7357 | 41.88 | 89.03 | 52.85 |
| 93.00 | 0.7685 | 41.93 | 86.73 | 55.20 |
| 94.00 | 0.8013 | 41.97 | 84.41 | 57.56 |
| 95.00 | 0.8342 | 42.02 | 82.10 | 59.92 |
| 96.00 | 0.8673 | 42.06 | 79.77 | 62.30 |
| 97.00 | 0.9003 | 42.11 | 77.44 | 64.67 |
| 98.00 | 0.9335 | 42.16 | 75.11 | 67.05 |
| 99.00 | 0.9667 | 42.20 | 72.76 | 69.44 |
| 100.00 | 1.0000 | 42.25 | 70.42 | 71.83 |

It will be apparent from this table that when operating with hydrofluoric acid of 68.97% concentration no difluorophosphoric acid is produced; that when operating with hydrofluoric acid of substantially 100% concentration approximately equal quantities of monofluorophosphoric and difluorophosphoric acids are produced and that between these two extremes progressively greater amounts of the difluorophosphoric acid are produced as the concentration of the hydrofluoric acid increases.

The temperature at which the reaction is performed may vary from very low ones to those exceeding the boiling point of hydrofluoric acid of 100% concentration but at temperatures exceeding the boiling point of low boiling reaction products, the reaction should be carried out in a closed system, with or without pressure, in order to avoid losses of hydrofluoric acid and of gaseous reaction products, the presence of which are necessary to secure an end-product consisting essentially of monofluorophosphoric acid or of monofluorophosphoric and difluorophosphoric acids.

For attainment of optimum results and products of essential purity the proportions of ingredients employed when operating with hydrofluoric acid of any given HF concentration within the ranges specified must be carefully followed in accordance with the foregoing table, as departures therefrom may result in production of impure difluorophosphoric acid distillates and/or fluorine-free phosphoric acid instead of distillation residues consisting only of monofluorophosphoric acid, and it is of utmost importance that none of the products incident to the reaction between the phosphorus pentoxide and hydrofluoric acid be permitted to escape from the reaction vessel. To this end the reaction may be carried out in a closed vessel of suitable type, or a vessel having a reflux condenser associated therewith whereby all gases and vapors developed during the reaction are returned by condensation or, in fact, by any means suitable for attainment of the desired end.

In the practice of the invention the reaction of the phosphorus pentoxide and the hydrofluoric acid may be effected in various ways. Thus the phosphorus pentoxide may be added in small portions, applying agitation, to liquid hydrofluoric acid maintained at such low temperature that the reaction products, gaseous at room temperature, remain dissolved in the liquid reaction product at ordinary pressure. Or, if preferred, hydrofluoric acid may be passed into a closed, evacuated, rotating cylindrical and suitably cooled container holding the phosphorus pentoxide so that hydrogen fluoride and low boiling reaction products are condensed, or the hydrofluoric acid may be passed into a closed, evacuated container holding the phosphorus pentoxide, applying pressure, or the phosphorus pentoxide with air as the carrier gas may be blown into a stream of evaporated hydrofluoric acid in such manner that the phosphorus pentoxide and hydrogen fluoride always meet in a ratio of 1 mol $P_2O_5:(2+X)$ moles $HF:(1-X)$ mole $H_2O$, if any, where X has any value in the range from 0 to 1 inclusive and all reaction products are conserved.

If a reaction temperature of lower than about 150° C. has been utilized, it is generally necessary to keep the reaction product in a closed container at an elevated temperature for a time sufficient to enable the above mentioned intermediate reactions to come to completion, the rate of these reactions depending upon the temperature. The time and temperature of this treatment may vary although generally a temperature of from about 90° C. to 150° C. and a time of from 2 to 12 hours is required. It will be understood, however, that the time and temperature just mentioned are by way of example only and not by way of limitation since other times and temperatures may be employed with equal facility and, further, that if the reaction of the phosphorus pentoxide with the hydrofluoric acid has taken place at temperature above about 150° C. usually no after treatment as just described is necessary since the intermediate reactions may have already taken place to greater or lesser extent.

It will be appreciated that the excess of water in hydrofluoric acids of less than about 69% HF is inimical to success of the method and attainment of the desired ends since when such acids are used the monofluorophosphoric acid produced is associated with fluorine-free phosphoric acid which cannot be separated from it.

The following are illustrative of different ways of practising the method of the invention in accordance with the general equation

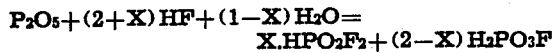

in which X has any value in the range from 0 to 1 inclusive:

*Example 1.*—58 parts by weight of aqueous hydrofluoric acid of about 69% HF are placed in a platinum bottle and cooled with a mixture of solid carbon dioxide and alcohol and 142 parts by weight of phosphorus pentoxide are added in small portions under agitation so that the temperature of the liquid does not rise substantially. The phosphorus pentoxide reacts vigorously with the aqueous hydrofluoric acid and dissolves quickly and after all the phosphorus pentoxide has been added to the acid a clear liquid is obtained. The bottle is then closed and heated for ten hours at 150° C. only slight pressure being developed during this operation. The resulting reaction product is anhydrous monofluorophosphoric acid which exhibits all analytical data and identifying characteristics described in said application, Serial No. 478,838. It cannot be purified by distillation.

*Example 2.*—142 parts by weight of phosphorus pentoxide are placed in a closed, jacketed, stainless steel mixer having two constantly rotating curved blades, and oil is circulated through the jacket. After the mixer has been evacuated aqueous hydrofluoric acid of about 69% HF is run into the mixer, later applying pressure, and by cooling the circulating oil and regulating the rate of introduction of the acid a temperature of about 180° C. is maintained in the mixer. After 58 parts by weight of the acid have been introduced the reaction product is allowed to slowly cool down to room temperature during a period of approximately 3 hours. The final product again is anhydrous monofluorophosphoric acid.

Since in these examples hydrofluoric acid of a concentration of about 69% HF is employed, the value of X in the general equation is 0 and it is thus simplified to $P_2O_5+2HF+H_2O=2H_2PO_3F$, no difluorophosphoric acid being produced.

At this point it may be observed that an aqueous hydrofluoric acid of approximately 69% HF concentration contains the acid and water in a ratio of 2 moles HF:1 mole $H_2O$, thus conforming to the general equation when X equals O.

The following are illustrative of the practice of the method where a more concentrated aqueous hydrofluoric acid is used:

*Example 3.*—58.5 parts by weight of aqueous hydrofluoric acid of 77.43% HF are placed in a platinum bottle and cooled with a mixture of solid carbon dioxide and alcohol and 142 parts by weight of phosphorus pentoxide are added in small portions under agitation so that the temperature of the liquid does not rise substantially. The phosphorus pentoxide reacts vigorously with the aqueous hydrofluoric acid and dissolves quickly, and after all the phosphorus pentoxide has been added to the acid a clear liquid is obtained. The bottle is then closed and heated for 10 hours at 100° C. only slight pressure being developed during this operation. The resulting reaction product is a mixture of monofluorophosphoric acid and difluorophosphoric acid and is subjected to distillation at a pressure of 50 mm. of mercury to separate the acids, the temperature of the batch being slowly raised to 150° C. but not higher. The vapors of difluorophosphoric acid evolved during the distillation are condensed by passing through a condenser cooled with brine of −20° C. and a yield of 176.2 parts by weight of monofluorophosphoric acid is obtained and 24.2 parts of crude difluorophosphoric acid. To further purify it, the difluorophosphoric acid may be re-distilled at a pressure of 200 mm. of mercury at which pressure it boils at about 70° C. It will be noted that in the reaction the components are used in the ratio of 1 mole $P_2O_5:(2+X)$ moles $HF:(1-X)$ mole $H_2O$.

*Example 4.*—59.0 parts by weight of aqueous hydrofluoric acid of 84.95% HF are combined with 142 parts by weight of phosphorus pentoxide in the manner described in Example 3 and the reaction product subjected to like treatment and subsequent distillation to separate the difluorophosphoric acid from the monofluorophosphoric acid. A yield of 150.9 parts by weight of the latter and 50.5 parts of the former is obtained and it will be noted that the components are supplied in the same ratio as in Example 3 but with X accorded a different value.

*Example 5.*—59.5 parts by weight of aqueous hydrofluoric acid of 91.78% HF are combined with 142 parts by weight of phosphorus pentoxide and the resultant product again treated as in Example 3. Components are thus supplied in the same ratio as in Examples 3 and 4 though again with a suitably different value for X, but because of the higher concentration of the hydrofluoric acid a yield of 128.3 parts by weight of monofluorophosphoric acid and 73.9 parts of difluorophosphoric acid is obtained after the distillation step.

In the three last examples the value of X in the general equation is intermediate between 0 and 1, having the lowest value in Eample 3 and progressively higher values in the others.

The following are illustrative of the practice of the method where hydrofluoric acid of a concentration of 100% HF is utilized, i. e., the anhydrous form of the acid, and as under these conditions the value of X in the general equation is 1, it is correspondingly simplified to

$$P_2O_5 + 3HF = HPO_2F_2 + H_2PO_3F$$

and in each instance a yield approximating the theoretical yield of monofluorophosphoric and difluorophosphoric acids respectively as set forth in the foregoing table is obtained.

*Example 6.*—60 parts by weight of anhydrous hydrogen fluoride are placed in a platinum bottle and cooled to the temperature of a mixture of solid carbon dioxide and alcohol. 142 parts by weight of phosphorus pentoxide are then added in small portions under agitation so that the temperature of the liquid does not rise appreciably. It will be noted that in the reaction the components are used in the ratio of 1 mole $P_2O_5$:3 moles HF. The phosphorus pentoxide reacts vigorously with the hydrogen fluoride and dissolves quickly and after all of it has been added to the acid a clear liquid is obtained. The bottle is then closed and heated for 8 hours at 85° C., only slight pressure being developed during this operation. The resulting reaction product is a mixture of difluorophosphoric and monofluorophosphoric acids and is subjected to distillation at a pressure of 50 mm. of mercury to separate the former from the latter, the temperature of the batch being slowly raised to 150° C. but not higher. The vapors of difluorophosphoric acid evolved during the distillation are condensed by passing through a condenser cooled with a brine of —20° C. and a yield of 97 parts by weight of crude difluorophosphoric acid is obtained and 103 parts of crude monofluorophosphoric acid. To further purify it the difluorophosphoric acid may be re-distilled as in Example 3. This purified product when analyzed by analytical methods established in the literature is found to contain P 30.6%; F 37.0% as against the calculated values respectively of P 30.4% and F 37.2%. The monofluorophosphoric acid is obtained as a distillation residue and is found to contain when likewise suitably analyzed P 30.7% F 20.1% as against the calculated values respectively of P 31.7% and F 19.0%.

*Example 7.*—142 parts by weight of phosphorus pentoxide are placed in a closed jacketed stainless steel mixer having two constantly rotating curved blades and cooled with a brine of —20° C. circulating through the jacket. The mixer is then evacuated and anhydrous hydrogen fluoride slowly passed into it, in the latest stage applying pressure. After 60 parts by weight of the fluoride have been introduced, the mixer inlet valve is closed and the mixer warmed up slowly to a final temperature of 90° C. and maintained there for 5 hours. The reaction product after distillation in the manner described in Example 6 affords a yield of 96 parts by weight of crude difluorophosphoric acid and a distillation residue of 104 parts by weight of monofluorophosphoric acid.

*Example 8.*—142 parts by weight of phosphorus pentoxide are placed in a mixer similar to that described in Example 7 and oil is circulated through its jacket. After the mixer has been evacuated anhydrous hydrogen fluoride is passed into it applying pressure. By suitable cooling of the circulating oil and regulation of the rate of introduction of the hydrogen fluoride into the mixer, a temperature of about 150° C. is maintained in the latter. After 60 parts by weight of the fluoride have been introduced, the mixer inlet valve is closed and the reaction product allowed to slowly cool down to room temperature for a period of approximately three hours. By like distillation of this product, a yield of 91 parts by weight of difluorophosphoric acid and 109 parts of monofluorophosphoric acid is obtained.

All the foregoing examples numbered 1 to 8 inclusive are given by way of illustration only and not in any restrictive or limiting sense since it will be understood from the foregoing description of the invention that so long as phosphorus pentoxide and the proper quantity of hydrofluoric acid of suitable HF concentration are mixed in the ratio of 1 mole $P_2O_5$:(2+X) moles HF:(1—X) mole $H_2O$ where X has any value in the range from 0 to 1 inclusive, with after treatment by heating the reaction product in a closed container or its equivalent if the reaction has not gone to completion according to the equation

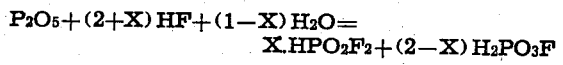

$$P_2O_5 + (2+X)HF + (1-X)H_2O = X.HPO_2F_2 + (2-X)H_2PO_3F$$

in which X has any value in the range from 0 to 1 inclusive, many other ways may be employed for combining and subsequently treating the initially supplied components in order to conform to special requirements of the equipment being utilized, the form in which the phosphorus pentoxide is most readily available and the like.

The reaction vessels may be those customarily utilized for similar or analogous operations and thus may be of the usual mixer or rotating drum types, while the distillation apparatus may be of any desired construction suitable for the purpose. The equipment may be made from stainless steel or other corrosion resistant material or may be plated therewith and, according to the conditions of the reaction, ordinary or pressure vessels may be used. The practice of the invention therefore does not require specially constructed apparatus and as substantially pure phosphorus pentoxide and hydrofluoric acid may be obtained without difficulty in the open market the invention readily lends itself to commercial usage.

It will now be apparent that practice of the method may be readily adjusted from time to time to conform to market demand for the acids or for other reasons without change in the equipment employed. Thus, for example, if during a certain period the said demand approximates 7 tons of the monofluorophosphoric acid to 3 tons of the difluorophosphoric acid, the method may be operated to produce both acids in approximately that ratio, or should demand for the difluorophosphoric acid become negligible it may be operated to produce the monofluorophosphoric acid alone, a feature of the invention which is obviously of great importance to manufacturers of these acids. Thus my invention for the first time, as far as I am aware, makes possible the production of anhydrous monofluorophosphoric acid, as well as anhydrous difluorophosphoric acid suitable for industrial purposes, from readily available materials in a convenient and commercially practical way.

Concerning some of the properties of these acids, it may be mentioned that anhydrous monofluorophosphoric acid $H_2PO_3F$ exhibits to a decided degree some of the chemical properties of concentrated sulfuric acid without showing any oxidizing action and anhydrous difluorophosphoric acid $HPO_2F_2$ resembles to some extent anhydrous perchloric acid without any oxidizing or explosive properties. In addition to having a number of properties of a non-oxidizing "pseudo-sulfuric" acid $H_2PO_3F$ and a non-explosive, non-oxidizing "pseudo-perchloric" acid $HPO_2F_2$, both acids are derivatives of hydrogen fluoride as well as of orthophosphoric acid, and they combine in a convenient form the reactivities of both anhydrous orthophosphoric acid and anhydrous hydrogen fluoride for a number of reactions.

The salts of both monofluorophosphoric and difluorophosphoric acids have been described in the literature. They may be produced now on a commercial scale by passing calculated quantities of the anhydrous acids in a thin stream into aqueous solutions of alkali bases or aqueous suspensions of non-alkali bases undergoing stirring and kept at a low temperature, and then by evaporating the water in good vacuo at a low temperature to avoid hydrolysis. Or dry amines, like anhydrous ammonia, methylamine, aniline, pyridine, are reacted in the theoretically required quantities with the strongly cooled acids. Of special interest are the aniline salts, which may be transformed into the diazonium compounds which, in turn, when heated in the absence of water, will form the corresponding aryl fluorophosphates with loss of their nitrogen.

The anhydrous fluorophosphoric acids may be used as catalysts for polymerization, condensation and alkylation reactions, especially for combining such compounds as isoalkanes and olefines or isoolefines. Esters may be prepared by reacting olefinic or acetylenic compounds with the anhydrous acids in the presence of catalysts, or by reacting alcohols or ethers with the anhydrous acids. Of special interest are the esters of monofluorophosphoric acid. Their similarity with the corresponding sulfuric acid derivatives is far-reaching. The long-chain monoalkyl-(and isoalkyl) monofluorophosphoric acid salts, such as sodium lauryl monofluorophosphate, are surface-active agents. Monoethyl-monofluorophosphoric acid, obtained e. g. by reacting the anhydrous acid with ethylene, forms diethyl monofluorophosphate in a reaction corresponding to that of monoethyl sulfuric acid which, when heated, forms diethyl sulfate.

Due to their non-oxidizing nature, both said fluorophosphoric acids may be used as anhydrous acids in the non-oxidizing refining of oils and the like, while other uses in addition to those just suggested may be readily devised and other compounds may be prepared from them by those skilled in the art.

Having thus described my invention, I claim and desire to protect by Letters Patent of the United States:

1. In a method of producing anhydrous monofluorophosphoric acid, the steps of mixing phosphorus pentoxide and hydrofluoric acid of any HF concentration between about 69% and 100% inclusive according to the equation

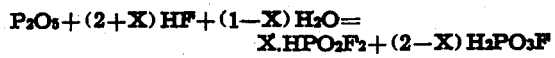

in which X has any value in the range from 0 to 1 inclusive, and maintaining the mixture in the presence of heat and under conditions preventing the escape of any products of the reaction until the latter goes to completion according to said equation.

2. In a method of producing anhydrous monofluorophosphoric acid, the steps of mixing phosphorus pentoxide and hydrofluoric acid of any HF concentration between about 69% and 100% inclusive according to the equation

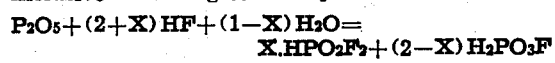

in which X has any value in the range from 0 to 1 inclusive, and heating while preventing escape of the reaction products until the reaction has gone to completion according to said equation.

3. In a method of producing anhydrous monofluorophosphoric acid, the steps of mixing phosphorus pentoxide and hydrofluoric acid of any HF concentration from about 69% to 100% inclusive in the ratio of 1 mole $P_2O_5$:$(2+X)$ moles HF:$(1-X)$ mole $H_2O$ where X has any value in the range from 0 to 1 inclusive, and then heating the product in a closed vessel at a temperature not exceeding about 150° C. until the reaction has gone to completion according to the equation

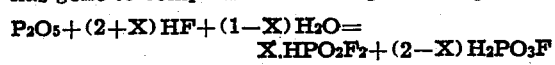

in which X represents any number between 0 and 1 inclusive.

4. The method of producing anhydrous monofluorophosphoric acid which includes the steps of mixing phosphorus pentoxide and a hydrofluoric acid of concentration exceeding 69% HF substantially according to the equation

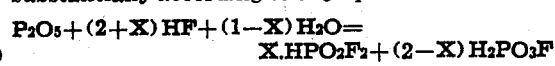

in which X has any value in the range from 0 to 1 inclusive, maintaining the mixture in a closed container at a temperature sufficient to cause the reaction to go to completion according to said equation and thereby form a resultant product containing monofluorophosphoric and difluorophosphoric acids, and then separating the difluorophosphoric acid in vapor form from the monofluorophosphoric acid by distillation.

5. The method of producing anhydrous monofluorophosphoric acid which includes the steps of mixing phosphorus pentoxide and a hydrofluoric acid of a concentration of from 69% to 100% inclusive HF in the ratio of 1 mole $P_2O_5$:$(2+X)$ moles HF:$(1-X)$ mole $H_2O$ in which X has any value from 0 up to and including 1, maintaining the ingredients in a closed vessel until completion of the reaction among them substantially according to the equation

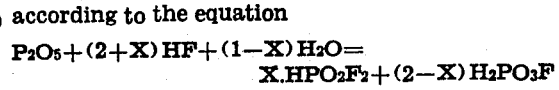

in which X has any value in the range from 0 to 1 inclusive to thereby form a resultant product containing monofluorophosphoric and difluorophosphoric acids, and then separating said acids by distillation.

6. The method of producing anhydrous monofluorophosphoric acid which comprises combining phosphorus pentoxide and hydrofluoric acid of HF concentration exceeding 69% substantially according to the equation $$P_2O_5 + (2+X)HF + (1-X)H_2O = X \cdot HPO_2F_2 + (2-X)H_2PO_3F$$

in which X has any value in the range from 0 to 1 inclusive, maintaining the reaction products in a closed vessel at a temperature and for a time sufficient to cause the reaction to go to completion according to said equation, and then separating the monofluorophosphoric and difluorophosphoric acids in the resultant product by distillation.

7. The method of producing anhydrous monofluorophosphoric acid which comprises mixing phosphorus pentoxide and hydrofluoric acid of about 69% HF in the ratio of 1 mole $P_2O_5$:2 moles HF:1 mole $H_2O$, and then maintaining the reaction product in a closed vessel at a temperature and for a time sufficient to cause the reaction to go to completion according to the equation $P_2O_5 + 2HF + H_2O = 2H_2PO_3F$.

8. In a method of producing anhydrous monofluorophosphoric acid, the steps of mixing phosphorus pentoxide and hydrofluoric acid of any HF concentration from about 69% to 100% inclusive in the ratio of 1 mole $P_2O_5$:(2+X) moles HF:(1−X) mole $H_2O$ in which X has any value in the range from 0 to 1 inclusive, and then maintaining the reaction products in a closed vessel at a temperature and for a time sufficient to cause the reaction to go to completion according to the equation $$P_2O_5 + (2+X)HF + (1-X)H_2O = X \cdot HPO_2F_2 + (2-X)H_2PO_3F$$

in which X represents any value in said range.

9. In a method of producing anhydrous monofluorophosphoric acid, the steps of mixing phosphorus pentoxide and hydrofluoric acid in the ratio of 1 mole $P_2O_5$:(2+X) moles HF:(1−X) mole $H_2O$ in which X has any value in the range from 0 to 1 inclusive, and maintaining the reaction products in a closed vessel to prevent loss thereof until the reaction has gone to completion according to the equation $$P_2O_5 + (2+X)HF + (1-X)H_2O = X \cdot HPO_2F_2 + (2-X)H_2PO_3F$$

in which X represents any value in said range.

10. The method of producing anhydrous monofluorophosphoric acid in conjunction with anhydrous difluorophosphoric acid which comprises mixing phosphorus pentoxide and anhydrous hydrofluoric acid substantially in the ratio of 1 mole $P_2O_5$:3 moles HF, and then maintaining the reaction products in a closed vessel at a temperature and for a time sufficient to cause the reaction to go to completion according to the equation $P_2O_5 + 3HF = H_2PO_3F + HPO_2F_2$.

11. The method of producing anhydrous monofluorophosphoric acid which comprises mixing phosphorus pentoxide and an aqueous hydrofluoric acid of about 69% HF and maintaining the mixture in a closed vessel until the reaction has gone to completion according to the equation $P_2O_5 + 2HF + H_2O = 2H_2PO_3F$.

12. That step in a method of producing anhydrous monofluorophosphoric acid which comprises mixing phosphorus pentoxide and an aqueous hydrofluoric acid of about 69% HF in a manner to prevent loss of reaction components or reaction products.

13. The method of producing anhydrous monofluorophosphoric acid which comprises mixing phosphorus pentoxide and an aqueous hydrofluoric acid of about 69% HF in the ratio of 1 mole $P_2O_5$:2 moles HF:1 mole $H_2O$, and then maintaining the mixture in a closed vessel until the reaction has gone to completion according to the equation $P_2O_5 + 2HF + H_2O = 2H_2PO_3F$.

14. The method of producing anhydrous monofluorophosphoric acid which comprises mixing phosphorus pentoxide and an aqueous hydrofluoric acid of about 69% HF in the ratio of 1 mole $P_2O_5$:2 moles HF:1 mole $H_2O$, and then heating the product in a closed vessel at a temperature not exceeding about 150° C. until the reaction has gone to completion according to the equation $P_2O_5 + 2HF + H_2O = 2H_2PO_3F$.

15. The method of producing anhydrous difluorophosphoric and monofluorophosphoric acids which comprises mixing phosphorus pentoxide and anhydrous hydrofluoric acid and maintaining the resultant product in a closed vessel until the reaction has gone to completion substantially according to the equation $$P_2O_5 + 3HF = HPO_2F_2 + H_2PO_3F$$

16. The method of producing anhydrous difluorophosphoric and monofluorophosphoric acids which comprises mixing phosphorus pentoxide and anhydrous hydrofluoric acid, maintaining the resultant mixture in a closed vessel until the reaction has gone to completion, substantially according to the equation $$P_2O_5 + 3HF = HPO_2F_2 + H_2PO_3F$$

and then separating the two acids in the resultant product by distillation.

17. The method of producing anhydrous difluorophosphoric and monofluorophosphoric acids which comprises mixing phosphorus pentoxide and anhydrous hydrofluoric acid, maintaining the resultant mixture in a closed vessel to thereby prevent the escape of reaction products until the reaction has gone to completion substantially according to the equation $$P_2O_5 + 3HF = HPO_2F_2 + H_2PO_3F$$

then distilling the resultant product to separate the difluorophosphoric acid in vapor form from the residual monofluorophosphoric acid, and condensing the vapor.

18. The method of simultaneously producing anhydrous difluorophosphoric and monofluorophosphoric acids which includes the steps of mixing phosphorus pentoxide and anhydrous hydrofluoric acid in the ratio of 1 mole:3 moles, preventing the escape of reaction products from the mixture until the reaction has gone to completion substantially according to the equation $$P_2O_5 + 3HF = HPO_2F_2 + H_2PO_3F$$

and then separating the difluorophosphoric acid in vapor form from the residual monofluorophosphoric acid by distillation.

WILLY LANGE.